UNITED STATES PATENT OFFICE.

HARRY HEY, OF MELBOURNE, VICTORIA, AUSTRALIA.

RECOVERY OF LEAD AND SILVER FROM SULFID ORES AND METALLURGICAL PRODUCTS.

1,384,465.     Specification of Letters Patent.     Patented July 12, 1921.

No Drawing.     Application filed May 6, 1920. Serial No. 379,302.

*To all whom it may concern:*

Be it known that I, HARRY HEY, a subject of the King of Great Britain, residing at Collins House, 360–366 Collins street, Melbourne, in the State of Victoria, Commonwealth of Australia, have invented certain new and useful Improvements in the Recovery of Lead and Silver from Sulfid Ores and Metallurgical Products, of which the following is a specification.

This invention relates to the recovery of lead and silver from sulfid ores and metallurgical products and refers more particularly to the treatment of sulfid ores containing lead and silver and zinc (such as the Broken Hill ores).

This invention is applicable to the treatment of concentrates, slimes, tailings and other metallurgical products as well as crude ores and it is to be understood that in this specification the term "ores" will include such products.

It has been proposed to treat ores of this description by effecting a preferential chloridization of the lead and silver subsequently leaching out the metallic chlorids so formed. One method for effecting this result is to mix the ore with an amount of zinc chlorid slightly in excess of that required for the chloridization of the lead and silver sulfid in the ore and to heat the admixture in a closed furnace without access of air to bring about the chloridizing reactions. The lead and silver chlorids are then leached out usually with hot brine solution containing a substance having a chloridizing reaction (such as ferric chlorid). Another method proposed for the treatment of ores of this description is to heat the ores with a sufficient quantity of strong hydrochloric acid at a temperature of 100° C. and subsequently leaching out the lead chlorid with hot water or strong brine. According to this latter method however the chloridization of both the lead and the silver is not effected.

The object of this invention is to provide certain improvements in the aforesaid methods of treatment whereby the chloridizing operation is effected in a more economical and efficient manner and the use of metal chlorids (such as zinc chlorid) obviated.

I accomplish this object by the use of hydrochloric acid as a chloridizing agent under such conditions that chloridization of both the lead and the silver is effected. I have found that this result is obtained when the ore is heated with hydrochloric acid at a temperature substantially above 100° C. The heating operation is preferably carried out in a closed vessel or under such conditions that oxidation and loss of volatile chlorids is substantially avoided and means should be employed for agitating the material being treated or otherwise bringing the reacting substances into intimate contact.

According to one part of this invention the ore is mixed with an amount of hydrochloric acid (preferably strong commercial acid) slightly in excess of that calculated to be required for the chloridizing of the silver and lead present. The hydrochloric acid is well and thoroughly incorporated with the ore and in some cases the mixture is then allowed to stand for several days. The mixture is then dried by heating it at a temperature lower than 100° C. for the removal of moisture. The dried mixture is then charged into a closed vessel or retort or other suitable furnace within which it is heated at a temperature substantially above 100° C.

From a series of experiments which have been conducted by me it has been demonstrated that a range of temperature for this heating operation of from 500° C. to 600° C. will give efficient results but it will be understood that I do not confine myself to this range of temperature. I have found that when heating at a lower temperature than 500° C. substantial chloridizing of the lead and silver can be obtained and also that when heating at higher temparatures than 600° C. almost complete chloridizing can be effected but for practical purposes I believe that a range of temperature from 500° C. to 600° C. will suffice. During this heating operation the mixture is subjected to a slight agitation or stirring by means of suitable mechanical devices whereby it is maintained in motion or it may be caused to progressively move through the retort or furnace. I have found that this operation is more effectively carried out when the copper is present in the mixture even in very small quantities.

After being subjected to this heating operation for the requisite period the mixture is removed and allowed to cool and in some cases the mixture is damped and allowed to stand for a period of several days. The chloridized mixture is then subjected to a leaching operation for the removal of the lead and silver chlorids either separately or together and for this purpose well known solvents are employed such as hot brine with a certain percentage of ferric chlorid.

By way of an illustration of the application of this invention I may mention certain experiments which have been conducted upon Broken Hill sulfid ores containing approximately 7.7% of lead, 48% zinc and 0.25% copper and 9 ozs. of silver per ton.

Example 1: To 100 parts of the above ore are added and incorporated 12 parts of commercial hydrochloric acid. The mixture was dried and then heated in a tube with occasional rabbling at a temperature of 600° C. for 30 minutes. The furnaced product was then cooled and leached with a hot brine solution containing ferric chlorid equivalent to 3 grams of iron per liter under conditions giving a minimum period of contact between the brine and the ore. The residues contained only .06% of lead and 1.8 ozs. of silver.

Example 2: To 100 parts of the above ore was added and incorporated 12.5 parts of commercial hydrochloric acid. The mixture was then allowed to stand for nineteen hours, dried, and then heated in a tube with occasional rabbling at a temperature of 550° C. to 600° C. for 30 minutes. The furnaced product was moistened and allowed to stand for four days and then leached with a hot brine solution containing ferric chlorid equivalent to 3 grams iron per liter under conditions giving a minimum period of contact between the brine and the ore. The residue contained a trace of lead and 1.8 oz. of silver per ton.

The temperature conditions necessary to effect the chloridization of the lead and silver cannot be definitely stated without reference to the class of ore treated but these conditions can be determined by conducting the following test.

A sample of the ore or metallurgical product in a relatively fine state of sub-division is mixed with an amount of hydrochloric acid solution about 30% in excess of that required to chloridize the lead and silver present. The mixture is then dried and portions thereof are separately heated and agitated at different temperatures in a closed vessel. The furnaced products are then leached with an excess of hot brine solution containing ferric chlorid under conditions giving only a short period of contact between the ore and solution. As the hot brine containing ferric chlorid dissolves the chlorid of silver and lead an assay of the residues will indicate the temperatures at which chloridization has been effective and of these temperatures the lowest will obviously be advantageously employed under commercial conditions.

I claim—

1. In the recovery of lead and silver from sulfid ores mixing the ore with hydrochloric acid and heating the mixture at a temperature substantially above 100° C. to effect a preferential chloridizing of the lead and silver present.

2. In the recovery of lead and silver from sulfid ores mixing the ore with hydrochloric acid sufficient in amount to chloridize the lead and silver present and then heating the mixture at a temperature substantially above 100° C. under non-oxidizing conditions to effect a preferential chloridizing of the lead and silver present.

3. In the recovery of lead and silver from sulfid ores mixing the ore with hydrochloric acid and heating the mixture at a temperature substantially above 100° C. under non-oxidizing conditions and subjecting the same to stirring or agitation during such heating operation to effect a preferential chloridizing of the lead and silver present.

4. In the recovery of lead and silver from sulfid ores mixing the ore with hydrochloric acid and heating the mixture at a temperature substantially above 100° C. under non-oxidizing conditions and subjecting the same to stirring or agitation during such heating operation to effect a preferential chloridizing of the lead and silver present then leaching out chlorids of lead and silver with suitable solvents substantially as described.

5. In the recovery of lead and silver from sulfid ores mixing the ore with hydrochloric acid then heating the mixture at a temperature below 100° C. for the removal of moisture, then heating the dried mixture at a temperature substantially above 100° C. cooling the product moistening and allowing it to stand and subsequently leaching out the lead and silver chlorids formed with suitable solvents substantially as described.

6. In the recovery of lead and silver from sulfid ores mixing the ore with hydrochloric acid solution sufficient in amount to chloridize the lead and silver present allowing the mixture to stand for some time then heating below 100° C. to remove moisture then heating the dried mixture at a temperature above 100° C. under such conditions that the preferential chloridizing of the lead and silver is effected, cooling the product, moistening and allowing it to stand for some days and finally leaching with a brine solution containing a substance having a chloridizing effect (such as ferric chlorid) substantially as described.

In testimony whereof I have signed my name to this specification in the presence of two subscribing witnesses.

HARRY HEY.

Witnesses:
I. W. GAILLEN,
P. W. POWELL.